UNITED STATES PATENT OFFICE.

ROBERT H. DIMOCK, OF NEW HAVEN, CONNECTICUT.

MARINE PAINT.

SPECIFICATION forming part of Letters Patent No. 236,216, dated January 4, 1881.

Application filed February 9, 1880.

*To all whom it may concern:*

Be it known that I, ROBERT H. DIMOCK, of New Haven, in the county of New Haven and State of Connecticut, have invented a new and Improved Marine Paint, of which the following is a specification.

The object of my invention is to preserve submarine structures of wood, also ships' bottoms, from the permanent attachment of barnacles and sea-weed and the attacks of marine worms and insects.

It consists of a paint made by incorporating with a drying-oil certain preparations of copper, so as to make a paint, as herein described, that shall be poisonous and destructive to animal and vegetable life.

The paint is prepared in the following manner: I take two hundred pounds of cupric sulphate, (blue vitriol,) sixty pounds of glucose, and carbonate of potash in the proportion of one hundred and sixty pounds of commercial carbonate of potash to two hundred pounds of the cupric sulphate. I dissolve the cupric sulphate in a sufficient quantity of hot water to make a solution, then add the glucose and stir for a few moments. The potash, dissolved in just water enough to make a solution and tested for the amount of pure alkali in it, is then added, in small portions at a time, to the above mixture, as effervescence ceases, until the quantity of potash added amounts to sixty pounds of pure alkali. Soda or other alkali may be used in lieu of potash, though I prefer the latter. Then I raise the mixture to a temperature of 212° Fahrenheit, and keep it at that point until the color of the solution changes as a precipitate forms from a greenish blue to a yellowish red. I then at once withdraw the heat and collect the precipitate—which precipitate consists of hydrated suboxide of copper mixed with some anhydrous suboxide of copper—on a felt filter, and wash with hot water and add washings to filtrate. Then I heat the filtered solution again at 212° Fahrenheit, collect the additional precipitate on filter, wash, and add it to previous precipitate. Then I dry this precipitate carefully, so as not to drive off the water of hydration, and add to the same, in an appropriate vessel, four pounds of carbolic acid of seventy-five per cent. solution, after adding carbolic acid to the still somewhat moist precipitate and allowing to stand for about five hours, or until color of compound changes on the surface from a yellow to a green. It is then subjected to a gentle heat, not exceeding 190° Fahrenheit, until of such consistency that it will mix with oil, and then I add enough raw linseed or other suitable oil—say six and a quarter gallons—to make the mixture or paint of a proper consistency for canning.

By keeping the precipitate moist or avoiding the complete drying of the same the water of hydration is preserved, and, besides, I am enabled to mix the precipitate with the oil without grinding.

For use this paint has but to be thinned with raw linseed-oil as in any ordinary paint, such as white lead, &c.

In the process of manufacture I recover sulphate of potassa (or of soda if the latter alkali has been used) by crystallization from the waste liquor.

I am aware that it is said that any paint for marine purposes is injured by mixing with the so-called "drying-oils;" but practical experience has taught me that the paint herein described is not so injured, but that in reality raw linseed-oil furnishes a better vehicle for my precipitate and a more durable coat than any of the many tarry and resinous vehicles.

I am aware, too, that patents have been granted to Charles Wetterstedt for the use of pure metallic alloys of copper and other metals in the form of powder mixed with vegetable tar and linseed-oil boiled with litharge or with naphtha, and in his specifications Wetterstedt refers to the protection of iron by the use of a mixed paint composed of metallic alloys and pure oxide of copper, prepared in a particular manner as an outer coating or glazing paint, to be applied upon his paint before mentioned. Reference is also made by Wetterstedt to a ship's paint which may be made of powdered antimony and pure oxide of copper, which paint, however, from the ready solubility of the antimony in water, would not afford much protection to a ship's bottom.

I am also aware that Tarr and Wonson have a patent granted to them for a paint made of oxide of copper produced by roasting pyritiferous ores, or from what is known in commerce as "copper scale," mixed with a suitable vehicle, substantially Stockholm tar and naphtha, and they claim the retardation of the solution of the oxide of copper in water by the earthy and metallic impurities existing in the pyritiferous ores, &c.

I am aware, too, that a patent has been granted to S. A. Gilman for a paint consisting of a tarry or resinous menstruum mixed with oxides, sulphides, or the insoluble salts or basic salts of copper produced by precipitation.

I disclaim all such compounds.

It is well known that the best copper paints in the market vary much in their action or effects, producing sometimes the desired effects and sometimes failing to do so, and that this variation is due to the uncertainty of their composition.

The paint produced by the process herein described is, however, always a certain product, always being produced by the same chemical reactions and subsequent mechanical manipulations. In the addition of carbolic acid to the suboxide of copper, also, I have abundant reason to believe that the carbolic acid unites chemically with the metallic base, forming a carbolate of copper, and which product seems to be particularly poisonous and destructive to the animal and vegetable life which it is intended to suppress.

Having thus fully described my invention, I claim as new and desire to secure by Letters Patent—

1. The paint herein described, composed of linseed-oil, suboxide of copper, and carbolic acid, compounded in the manner and in about the proportions described.

2. The process, substantially as herein described, for producing a marine paint, which consists in adding glucose to a hot solution of cupric sulphate, in then stirring the mixture and adding an alkaline solution, in then raising the temperature of the solution until a precipitate forms, in then collecting, filtering, and washing and drying the precipitate, in then adding carbolic acid to the precipitate, and in then mixing the compound with raw linseed-oil.

ROBT. HEMPHILL DIMOCK.

Witnesses:
HENRY C. PLATT,
WILLIS G. JUDSON.